United States Patent [19]

Albrethsen et al.

[11] 3,969,202

[45] July 13, 1976

[54] PROCESS FOR THE RECOVERY OF ANTIMONY VALUES FROM ORES CONTAINING SULFO-ANTIMONY COMPOUNDS OF COPPER, AND ARSENIC

[75] Inventors: Adrian E. Albrethsen, Somerville; Max L. Hollander, Plainfield, both of N.J.; William H. Wetherill, Staten Island, N.Y.

[73] Assignee: Asarco Incorporated, New York, N.Y.

[22] Filed: June 2, 1975

[21] Appl. No.: 582,954

[52] U.S. Cl. .............................. 204/105 R; 423/87; 75/21; 75/69; 75/108; 75/101 R
[51] Int. Cl.[2] .................................................. C25C 1/22
[58] Field of Search ................ 423/87; 75/21, 108, 75/69, 101 R; 204/105 R

[56] References Cited
UNITED STATES PATENTS

| | | | |
|---|---|---|---|
| 2,446,656 | 8/1948 | Lebedeff et al. | 75/21 |
| 3,883,345 | 5/1975 | Caldon et al. | 75/69 |

Primary Examiner—R. L. Andrews
Attorney, Agent, or Firm—R. J. Drew; E. J. Schaffer

[57] ABSTRACT

Tetrahedrite ore concentrate, sodium sulfide added as such or formed in situ, calcium values preferably supplied as lime, and a reducing agent, e.g. coke, are smelted for a period sufficient to convert a major portion or substantially all of the antimony to a water-soluble sodium compound of antimony and sulfur and a major portion or substantially all of the arsenic also contained in the concentrate to a water-insoluble calcium compound of arsenic and oxygen. The sodium sulfide is incorporated into the charge for the smelting in an amount sufficient to convert at least a major portion of the antimony into the water-soluble sodium compound of antimony and sulfur; and the lime is incorporated into the smelting charge in amount sufficient to convert at least a major portion of the arsenic into the water-insoluble calcium compound of arsenic and oxygen. A soda matte obtained from the smelting and containing the soluble sodium compound of antimony and sulfur and the insoluble calcium compound of arsenic and oxygen as well as a water-insoluble sulfur compound of copper is leached with an aqueous liquid, ordinarily water, to dissolve substantially only the soluble sodium compound of antimony and sulfur. The aqueous leach solution containing the soluble sodium compound of antimony and sulfur is separated from an insoluble leach residue containing the insoluble calcium compound of arsenic and oxygen and the insoluble sulfur compound of copper.

27 Claims, 1 Drawing Figure

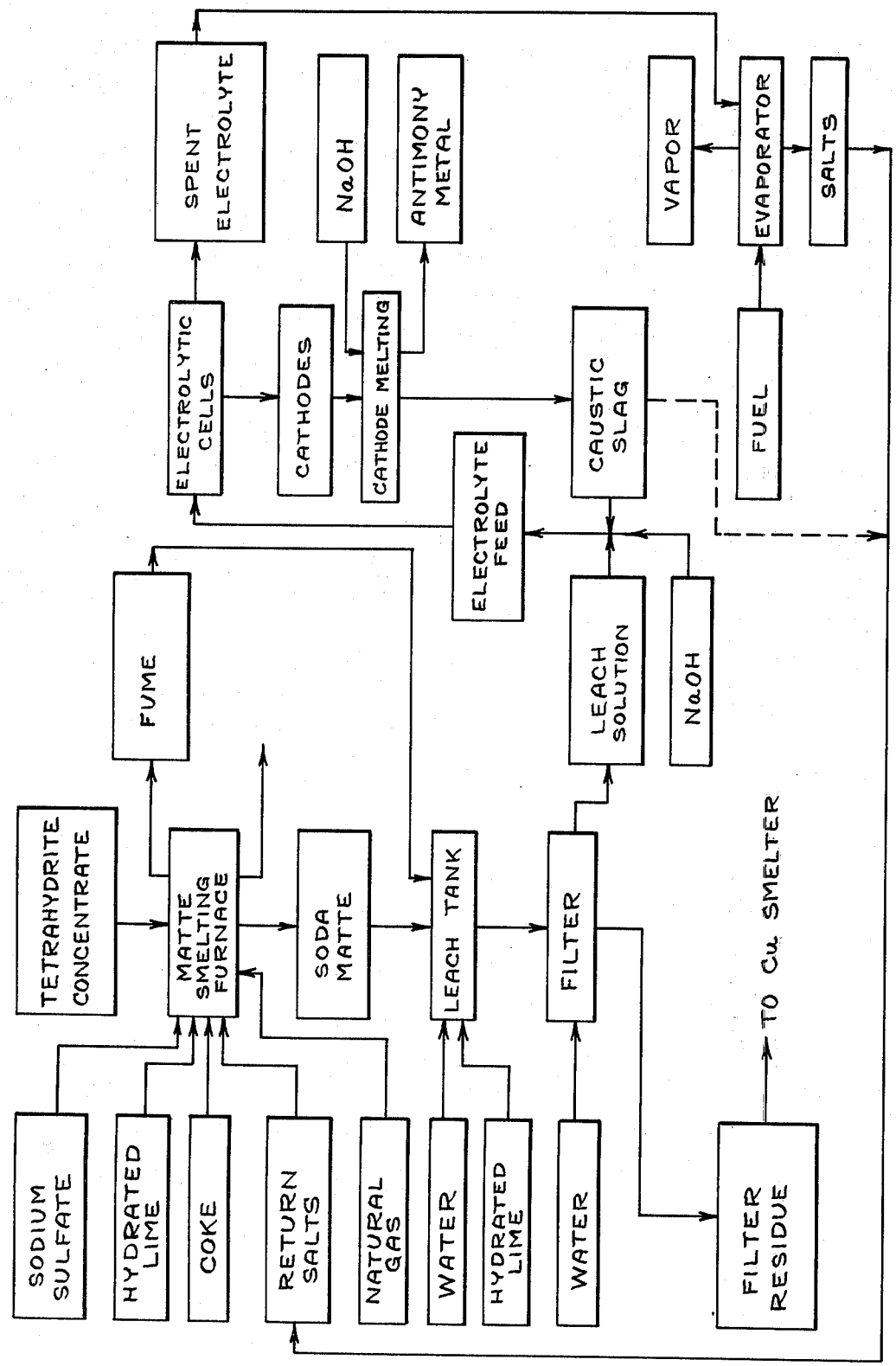

PROCESS FOR THE RECOVERY OF ANTIMONY VALUES FROM ORES CONTAINING SULFO-ANTIMONY COMPOUNDS OF COPPER, AND ARSENIC

BACKGROUND OF THE INVENTION

1. Statement of the Invention

This invention relates to the recovery of antimony values and more particularly to a process for the recovery of antimony values from ores or ore concentrates containing sulfo-antimony compounds of copper.

2. Description of the Prior Art

Ores containing sulfo-antimony compounds of copper, such as tetrahedrite ore or ore concentrate, frequently contain arsenic as an impurity due to the arsenic substituting for some of the antimony in the tetrahedrite. The presence of the arsenic is undesirable as the chemistry of the arsenic follows generally that of the antimony, and consequently the arsenic reports in excessive amounts in the antimony upon recovery of the antimony from the tetrahedrite. Inasmuch as the specifications for market grade antimony call for, by weight, 0.05% maximum arsenic in one grade of antimony and 0.10% maximum arsenic in another grade thereof, and the arsenic usually reports in the antimony in amounts appreciably in excess of 0.10% by weight, the presence of the excessive amount of arsenic in the antimony is undesirable and disadvantageous from a commercial standpoint.

U.S. Pat. No. 1,654,527 discloses the production of metallic antimony and alloys containing antimony and alkali metal arsenates from antimony- and arsenic-containing ores. Antimony trioxide is mixed with a stoichiometric amount of arsenic trioxide and heated in the presence of an alkali metal compound such as sodium carbonate or sodium hydroxide to obtain metallic antimony and an alkali metal arsenate in two separate layers. The alkali metal arsenate is recovered by leaching and crystallization. U.S. Pat. No. 1,523,980 discloses the removal of arsenic present in antimonial metals or antimonial lead by stirring the molten metal or alloy with caustic soda or soda ash to remove the arsenic without affecting the antimony. U.S. Pat. No. 1,097,897 discloses the extraction of antimony from its sulfide ores by melting the ore with sodium sulfate, carbon, iron sulfide and sodium carbonate to form the sulfo salt and oxide of antimony, removing the slag formed during the melting operation, smelting the sulfo salt and oxide of antimony with iron and carbon to form Sb, and recovering the iron sulfide and sodium sulfide from the slag formed during the reduction process by leaching to dissolve the sodium sulfide in the leaching water. U.S. Pat. No. 1,104,810 discloses the recovery of arsenic and antimony from ores by mixing the finely divided ore with sulfur and sodium sulfide or calcium sulfide. The quantity of sodium sulfide or calcium sulfide added to the ore is calculated to assure that the arsenic and antimony are converted into double sulfides with the sodium or calcium which are water-soluble, and can therefore be extracted by leaching in water. The resulting mixture is heated at a low temperature in a furnace and then leached. U.S. Pat. No. 3,709,680 discloses the removal of arsenic from a sulfo-ore concentrate such as, for example, tetrahedrite by leaching the sulfo-ore concentrate with an alkali metal sulfide solution which dissolves the arsenic to form an arsenic pregnant solution and an insoluble residue, separating the undissolved residue therefrom, acidifying the arsenic pregnant solution to precipitate arsenic and other mineral values as insoluble salts and to form an arsenic barren solution, and treating the arsenic barren solution to regenerate sulfur and sodium values for recycle to the process. U.S. Pat. No. 2,348,360 discloses recovery of antimony from ore also containing arsenic and copper without forming semimetallic sulfides of calcium. Sulfur and sodium carbonate is mixed with the ore, the mixture is heated rapidly and excess sulfur vaporized, and the residue is then leached with water. Both the antimony and arsenic are rendered water-soluble. The leach solution is filered and $H_2S$ gas then contacted with the solution to precipitate antimony pentasulfide, which is recovered by filtration. U.S. Pat. No. 2,230,972 discloses the recovery of antimony from ores also containing tin by roasting the ore in the presence of a carbonaceous reducing agent, an alkali metal compound such as soda ash, and sulfur. Sodium sulfide is utilizable in place of the soda ash and sulfur. The antimony and tin are converted into soluble polysulfides which are recovered from the ore by water leaching. The antimony may be recovered by electrowinning. U.S. Pat. No. 2,116,891 discloses the removal of antimony, arsenic, copper, zinc, etc. from non-ferrous metal scraps, by covering the molten metal scrap with a layer of caustic alkali such as sodium hydroxide, whereby the sodium and antimony unite to form intermetallic compounds. If arsenic is present in the metal scrap, the sodium-antimony compound will also include the analogous sodium-arsenic compound, such compounds having a lower specific gravity than the molten metal from which they separate and rise to the surface to form a layer of pasty or mushy consistency which is periodically skimmed off.

OBJECTS OF THE INVENTION

One object of the invention is to provide a new and improved process for the recovery of antimony values from ore and ore concentrates containing sulfo-antimony compounds of copper and also containing arsenic, for example tetrahedrite.

Another object of the invention is to provide a new and improved process for the treatment of ore and ore concentrates containing sulfo-antimony salts of copper and also containing arsenic, for example tetrahedrite, to separate undesirable arsenic from the antimony and to separate and concentrate the antimony and copper values in a form from which these values can be readily recovered.

A further object is to provide a new and improved process for the treatment of ore and ore concentrates containing sulfo-antimony salts of copper and also containing arsenic and silver, for example tetrahedrite, to separate arsenic from the antimony and to separate and concentrate the antimony, copper and silver values in forms from which these values can be readily recovered.

An additional object of this invention is to provide a new and improved process for the recovery of antimony values from ore and ore concentrates containing sulfo-antimony compounds of copper, and also containing arsenic, for example, tetrahedrite, which yields high purity antimony metal containing less than 0.01% arsenic.

Additional objects and advantages will be readily apparent as the invention is hereinafter described in detail.

BRIEF SUMMARY OF THE INVENTION

The aforementioned objects are attained by the process of this invention which comprises:

a. smelting a charge containing a material, e.g. an ore or ore concentrate, containing the sulfo-antimony compound or compounds of copper, and arsenic, e.g. tetrahedrite, sodium sulfide, calcium values supplied as lime and/or calcium carbonate, and a reducing agent, usually a carbonaceous solid reducing agent, e.g. coke, for a period sufficient to convert at least a major portion of the antimony to a water-soluble alkali metal compound of antimony and sulfur and at least a major portion of the arsenic to a water-insoluble calcium compound of arsenic and oxygen;

b. the sodium sulfide being incorporated in the smelting charge in an amount sufficient to convert a major portion, all or substantially all of the antimony into the water-soluble sodium compound of antimony and sulfur, and the calcium values being supplied to the smelting charge in an amount sufficient to convert a major portion, all or substantially all of the arsenic into the water-insoluble calcium compound of arsenic and oxygen;

c. leaching an alkaline matte obtained from the smelting of (a) and containing the water-soluble alkali metal compound of antimony and sulfur, the water-insoluble calcium compound of arsenic and oxygen and a water-insoluble sulfur compound of copper with an aqueous liquid, ordinarily water, to dissolve the soluble alkali metal compound of antimony and sulfur therein to the substantial exclusion of the calcium compound of arsenic and oxygen and sulfur compound of copper; and d. separating an aqueous liquid leach solution containing the soluble alkali metal compound of antimony and sulfur from an insoluble solid leach residue containing the insoluble calcium compound of arsenic and oxygen and the insoluble sulfur compound of copper.

It is critical for good results, that sodium salts, e.g. sodium sulfide or sodium sulfate, be utilized for the smelting inasmuch as the potassium salts, e.g. potassium sulfide or potassium sulfate, were found to be very inferior. With utilization of the sodium salts in the smelting, over 90% extraction of antimony from tetrahedrite was achieved. However, with the substitution of the potassium salts for the sodium salts, despite using over twice as much of the potassium, the antimony extraction was considerably less. The striking superiority of the sodium salts over the potassium salts for use in the smelting for the recovery of the antimony was unexpected.

The sodium sulfide is incorporated in the smelting charge usually in an amount which is sufficient to provide in the solution obtained by leaching the matte produced by the smelting an atomic ratio of $S^=$ to Sb within the atomic ratio range of about 2.0:1 to about 3.5:1 respectively. The calcium values are supplied to the smelting charge usually in an amount which is sufficient to provide in the resulting alkaline matte an atomic ratio of Ca to As within the atomic ratio range of about 1.3:1 to about 9.5:1 respectively.

BRIEF DESCRIPTION OF THE DRAWING

The accompanying drawing is a diagrammatic flow sheet illustrating one embodiment of the process of this invention.

DETAILED DESCRIPTION OF THE DRAWING

With reference to the flow sheet of the drawing, an ore containing a sulfo-antimony compound of copper and arsenic, e.g. tetrahedrite ore concentrate (one formula for tetrahedrite being 4 $Cu_2S.Sb_2S_3$), is charged to a matte smelting furnace. Sodium sulfate, lime and/or calcium carbonate, and a reducing agent, for example a solid carbonaceous reducing agent, e.g. coke, are also charged to the smelting furnace. The charge is smelted in the smelting furnace at a temperature in the range of about 1600°F. to about 1900°F. and under a non-oxidizing atmosphere, ordinarily a slightly reducing atmosphere, for a time sufficient, typically about 1½ – 2 hours, to convert substantially all of the antimony into the water-soluble sodium compound of antimony and sulfur, $Na_3SbS_3$, and to convert substantially all of the arsenic into one or more water-insoluble calcium compounds of arsenic and oxygen, for example calcium ortho arsenate, i.e., $Ca_3(As\ O_4)_2$ and/or calcium arsenite, i.e., $Ca_3(As\ O_3)_2$. The copper values contained in the tetrahedrite ore concentrate appear to remain during the smelting as a water-insoluble sulfur compound of copper, such as, for example, an insoluble sulfide of copper, e.g., $Cu_2S$, and any silver which may be present in the concentrate due to silver substituting for copper in the tetrahedrite, also appears to remain as a water-insoluble sulfur compound of silver during the smelting, such as, for example, the insoluble sulfide of silver, $Ag_2S$. The copper and any silver present report in the insoluble leach residue with the insoluble calcium compound of arsenic and oxygen as the insoluble sulfur compound of copper and the insoluble sulfur compound of silver. The time of smelting may be shorter or longer than the aforementioned about 1½ – 2 hours smelting time, depending on the configuration and size of the smelting furnace and the rate of firing such furnace.

The amount of calcium values charged to the smelting furnace as lime and/or calcium carbonate is preferably an amount thereof sufficient to convert at least a major portion of the arsenic into the water-insoluble calcium compound of arsenic and oxygen, such as calcium arsenate, but an amount thereof which is insufficient to result in the alkaline matte becoming excessively refractory and insufficiently fluid, i.e., insufficiently flowable, to be readily removed from the furnace at about 870°C. – 1040°C. smelting temperature. Instead of sodium sulfate, one or more of the following sodium compounds can be charged to the smelting furnace as a source of the sodium compound, sodium carbonate, sodium sulfide, sodium hydroxide, sodium sulfite, sodium thiosulfate and sodium hydrosulfide.

The quantity of reducing agent charged to the smelting furnace is an amount sufficient to reduce a preponderant portion of the sulfur present which is of a higher valent state than sulfide sulfur to sulfide sulfur, i.e., $S^=$. In the case of a carbonaceous reducing agent, e.g. coke, such carbonaceous reducing agent is charged to the smelting furnace in amount of typically about 5% by weight of the smelting charge. Other reducing agents utilizable in the smelting herein include other solid carbonaceous reducing agents, e.g. coal, and gaseous reducing agents including gaseous carbonaceous reducing agents, e.g. natural gas, methane or ethane and hydrogen. The gaseous reducing agent can be fed to the smelting furnace charge through a lance or lances.

An alkaline matte or soda matte, is produced in the smelting furnace by the smelting, and is removed from the smelting furnace as a molten liquid or flowable semi-solid. The matte is then solidified, ordinarily by being permitted to cool to form a solidified mass, and the solidified matte is then reduced to particulate form, for instance by crushing to typically about ¼ inch particle size. The matte contains the water-soluble sodium compound of antimony and sulfur, $Na_3SbS_3$, one or more water-insoluble calcium compounds of arsenic and oxygen, a water-insoluble sulfur compound or compounds of copper, e.g. $Cu_2S$, and, if any silver was present in the ore concentrate, a water-insoluble sulfur compound of silver, e.g. $Ag_2S$.

The particulate soda matte is leached with water in a leach tank while agitating the liquid vigorously to keep the matte particles in suspension. The leaching is preferably carried out at elevated temperature of the leach water or solution in the range of about 65°C. to about 90°C. so as to attain a reasonably fast leaching rate. Normal or room temperature can be used for the leaching, if desired, but at a slower leaching rate. Fume evolved during the smelting step and recovered in a bag house and comprising primarily antimony and alkali metal, e.g. sodium, as well as lesser amounts of arsenic, copper and sulfur and usually also a smaller amount of silver, when present, can, if desired, be supplied into the leach tank with the particulate soda matte. Calcium values supplied as lime and/or calcium carbonate, are also preferably added to the leach solution or mixture in the leach tank, inasmuch as the addition of the calcium values to the leach solution in the leach tank results in a considerable further reduction of arsenic in the leach solution by precipitation of the arsenic as a water-insoluble calcium compound or compounds of arsenic and oxygen, such as, for example, calcium ortho arsenate and/or calcium arsenite. The calcium values when added to the leach solution or mixture, are added thereto in a stoichiometric amount, or slight excess over the stoichiometric amount, e.g. a 5% by weight excess over the stoichiometric amount, for reacting with all of the arsenic present to form calcium ortho arsenate, $Ca_3(AsO_4)_2$, and/or calcium arsenite, $Ca_3(AsO_3)_2$, in accordance with the equations:

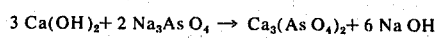

$$3 Ca(OH)_2 + 2 Na_3AsO_4 \rightarrow Ca_3(AsO_4)_2 + 6 NaOH$$

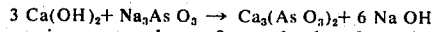

$$3 Ca(OH)_2 + Na_3AsO_3 \rightarrow Ca_3(AsO_3)_2 + 6 NaOH$$

The mixture or slurry from the leach tank is filtered and a leach solution comprising primarily the soluble antimony values and also sodium and sulfur and a lesser amount of arsenic is thereby separated from a filter solid residue cake comprising primarily the insoluble arsenic and copper values and sulfur, sodium and calcium values as well as silver and a smaller amount of antimony. The filter cake is ordinarily destined to be charged to a copper smelter.

The leach solution is passed into the electrolytic cell of the electrowinning operation, for electrolytic recovery of metallic antimony. Prior to passing the leach solution into the electrowinning electrolytic cells, an alkaline material, usually caustic soda, is ordinarily added to the leach solution to adjust the weight ratio of caustic (calculated as Na) to total sulfide sulfur (calculated as $S^=$) to typically about 1.4:1 respectively, so as to obtain therein the desired weight ratio of caustic (calculated as Na) to total sulfide sulfur (calculated as $S^=$). The leach solution will then ordinarily have a pH of about 14 to about 14.2. A caustic slag comprising primarily sodium and antimony values and a small amount of arsenic values and obtained from the cathode antimony melting operation is usually also admixed with the leach solution prior to its introduction into the electrowinning electrolytic cells.

The electrowinning is carried out in electrolytic cells having mild steel cathodes and mild steel anodes. The electrical current is supplied for the electrowinning at a current density of typically 100 – 150 amps per square foot at the anode and typically 20 amps per square foot at the cathode.

The electrodeposited antimony is periodically stripped, typically about every 2 days, from the cathode starting sheets. The deposited antimony cathode is quite brittle and ordinarily breaks into pieces during the stripping. The stripped antimony cathode pieces or particles are melted under a non-oxidizing atmosphere, usually a reducing atmosphere, in a melting furnace for antimony cathodes.

During the melting of the antimony cathode pieces in the melting furnace, the sulfide sulfur present in the electrolyte occluded or entrapped in the antimony cathode pieces from the electrowinning cells serves to further purify the antimony by forming a sulfur compound or compounds of any residual arsenic present in the antimony as an impurity, e.g. $AsSbS_3$, which is insoluble in the antimony. The molten antimony is treated in an impurities slagging operation with one or a plurality, ordinarily two, additions of caustic soda with removal of the resulting caustic slag from the surface of the molten antimony, usually by skimming, between the caustic additions. The molten antimony is usually agitated during the addition of the caustic thereto, with a suitable stirrer or mixing device. The purpose of the caustic treatment is for the separation of the antimony-insoluble sulfur compound or compounds of arsenic, e.g. $AsSbS_3$, which reports in the caustic slag. The caustic slag comprising primarily sodium and antimony values and a lesser, small amount of arsenic values may be added to the leach solution, prior to its introduction into the electrolytic cells of the electrowinning, for electrowinning recovery of the antimony. Alternatively, such caustic slag can be returned to the smelting charge either separately or together with the "return salts" hereafter disclosed.

The spent electrolyte solution from the electrolytic cells of the electrowinning containing primarily sodium and sulfur and lesser amounts of antimony and arsenic is usually passed to an evaporator and heated therein to evaporate off water and leave solid salts. The salts, also referred to herein as "return salts," and containing primarily sodium and sulfur and lesser amounts of antimony and arsenic are ordinarily returned for introduction into the matte smelting furnace.

When antimony oxide is the desired end product instead of metallic antimony, the antimony metal obtained from the electrowinning is oxidized to antimony oxide ($Sb_2O_3$) by conventional technology well known to the art. One procedure for effecting the oxidation is by contacting the metallic antimony with a stream of free oxygen-containing gas, e.g. air, at elevated temperature.

The lime utilized in the process herein can be lime, i.e., CaO, and/or slaked lime, i.e., $Ca(OH)_2$.

If a mixture of lime and limestone is utilized to supply the calcium values to the smelting charge, the lime and limestone can be present therein in proportions within wide proportion ranges, for example 1% to 99% by weight of limestone and 99% to 1% for weight of lime.

DESCRIPTION OF THE PREFERRED EMBODIMENTS

The calcium values are preferably supplied as CaO to the smelting charge, and preferably as $Ca(OH)_2$ to the leach solution when added thereto. Preferably, the sodium sulfide is supplied to or incorporated in the smelting charge in the smelting furnace in an amount sufficient to provide in the leach solution obtained from leaching the matte produced by the smelting an atomic ratio of $S^=$ to Sb within the atomic ratio range of about 2.5 : 1 to about 3,2 : 1 respectively. Preferably, the calcium values are supplied to or incorporated in the smelting charge in the smelting furnace in an amount to provide in the resulting alkaline matte an atomic ratio of Ca to As within the atomic ratio range of about 2.5 : 1 to about 5 : 1 respectively.

The preferred reducing agent is a solid carbonaceous reducing agent, preferably coke.

The preferred smelting temperature is in the range of about 870°C. to about 955°C.

The calcium values are preferably also added to the leach solution or mixture during the leaching step, as well as being added to the charge in the smelting step. Preferably a major portion, ordinarily in the range of about 60% to about 80% by weight, of the total calcium values added in both the smelting and leaching is added to the charge in the smelting step, and a minor portion, ordinarily in the range of about 40% to about 20% by weight of the total calcium values, is added to the leach solution in the leaching step. The quantity of calcium values added to the smelting charge is an amount sufficient to convert a major portion, substantially all, or all of the aresnic into one or more water-insoluble calcium compounds of arsenic and oxygen, e.g., the water-insoluble calcium ortho-arsenate, $Ca_3(AsO_4)_2$, and/or water-insoluble calcium arsenite, $Ca_3(AsO_3)_2$, but which is an amount insufficient to result in the alkaline matte becoming excessively refractory and insufficiently fluid to be readily removed from the smelting zone at the about 870°C. – 1040°C. smelting temperature. The quantity of calcium values also added to the leach solution or mixture during the leaching operation is an amount at least sufficient to stoichiometrically react with all remaining arsenic values present to form the insoluble calcium ortho-arsenate in accordance with the equation previously set forth herein. The addition of the calcium values to the leach solution also performs the important function of removing any dissolved $CO_2$ in the leach solution, due to atmospheric contamination of the leach solution with $CO_2$ during the leaching.

The temperature of the leach water or solution during the leaching is preferably in the range of about 65°C. to about 90°C., more preferably in the range of about 80°C. to about 90°C.

The control of arsenic in the leach solution significantly improved as the atomic ratio of calcium to arsenic in the smelting charge was increased, as is shown by the test data in the Table I test results hereafter set forth. Although antimony extraction was not adversely affected up to an atomic ratio of calcium to arsenic of 2.2:1 respectively, it did undergo a marked drop at a calcium to arsenic atomic ratio of 3.2:1 respectively in the smelting charge, also as shown by the test results in Table I which follows:

TABLE I

| Test No. | Atomic Ratio Ca/As in Smelting Charge | Characteristics of Leach Solution | | Sb Extraction % of Matte Input |
|---|---|---|---|---|
| | | Weight Ratio Sb/As | Atomic Ratio S*/Sb | |
| 1 | 0.0 | 10.7 | 3.85 | — |
| 2 | 0.0 | 9.3 | 3.84 | 97.0 |
| 3 | 0.64 | 12.8 | 4.17 | 94.8 |
| 4 | 1.6 | 16.1 | 4.04 | 96.7 |
| 5 | 2.2 | 29.0 | 4.14 | 98.0 |
| 6 | 3.2 | 60.7 | 4.23 | 83.1 |

*Means total sulfur.

The test data set forth in Table II which follows shows the considerable improvement in arsenic control, i.e., the reduction of the amount of arsenic in the leach solution, unexpectedly attained by the addition of lime to the leach solution as well as to the smelting charge. The matte, which already contained calcium added during the smelt, had the following composition: Sb, 11.2; As, 1.37; Na, 15.6; S, 27.8; and CaO, 2.5; percentages being by weight.

Table II

| Test No. | Lime Addition To Leach Solution % of Matte Weight | Characteristics of Leach Solution | |
|---|---|---|---|
| | | Weight Ratio Sb/As | Atomic Ratio S*/Sb |
| 1 | 0 | 22.4 | 3.42 |
| 2 | 0 | 22.9 | 3.44 |
| 3 | 2.5, added before matte | 98.0 | 3.31 |
| 4 | 2.5, added before matte | 63.8 | 3.41 |
| 5 | 2.5, added after matte | 80.0 | 3.33 |
| 6 | 2.5, added after matte | 75.3 | 3.34 |

*Means total sulfur.

In Tests Nos. 1 and 2, the lime was only added to the smelting charge, in Tests Nos. 3 and 4, the additional lime was added to the leach water prior to the addition of the matte to the leach water, and in Tests Nos. 5 and 6, the additional lime was added to the leaching water or solution after the matte was added to such water.

Tests were also conducted to determine the effect of (1) adding the lime to the smelting charge prior to melting the charge, and (2) melting the smelting charge without the lime and then adding the lime to the molten charge after holding the molten charge in the absence of the lime for a certain time. In one group of such tests, the lime $(Ca(OH)_2)$ was mixed with the other constituents of the smelting charge, and the entire mixture melted down and held for the full 45 minute smelting time. In the second group of tests, the constitutents of the smelting charge exclusive of the lime was melted down and held for about 35 minutes. The lime (Ca(OH)$_2$) was then added to the molten charge and stirred in with a wooden stick. After holding the resulting molten mass for an additional 10 minutes, the crucible containing the matte was removed from the furnace. The results of such tests are set forth in Table III which follows:

TABLE III

| Test No. | Amount Ca(OH)$_2$ (grams) | Method of Ca(OH)$_2$ Addition to the Charge | Sb/As Ratio in Leach Solution |
|---|---|---|---|
| 1 | 18 | In the charge before melting | 8.5/1.0 |
| 2 | 18 | Added after melting | 7.1/1.0 |
| 3 | 9 | In the charge before melting | 6.1/1.0 |
| 4 | 9 | Added after melting | 6.4/1.0 |
| 5 | 36 | In the charge before melting | 13.0/1.0 |
| 6 | 36 | Added after melting | 9.7/1.0 |

With both the relatively medium and relatively high lime additions in Tests Nos. 1 and 5, the leach solution contained less arsenic when the lime was incorporated in the charge prior to melting the charge than when the same amount of lime was added after the charge was molten. With the relatively low lime addition to the smelt in Tests Nos. 3 and 4, the manner of lime addition had little effect.

The following examples further illustrate the invention:

EXAMPLE I

Tetrahedrite ore concentrate in the amount of 6.58 tons was introduced into the matte smelting furnace. The concentrate contained, by weight, 15.2% Sb, 2.8% As, 27.2% Cu, 27.1% S and 2.53% Ag. 0.466 ton of hydrated lime, 0.613 ton of coke and 4.80 tons of recycle salts from an evaporator hereinafter referred to were also charged into the matte smelting furnace, which was fired with natural gas. The charge was smelted in the smelting furnace at a temperature in the range of about 925°C. to about 985°C. under a slightly reducing atmosphere for about 2 hours, whereby substantially all the antimony was converted into the water-soluble Na$_3$SbS$_3$ and substantially all the arsenic was converted into the water-insoluble Ca$_3$(AsO$_4$)$_2$. The recycle salts from the evaporator contained, by weight, 2.25% Sb, 1.12% As, 17.7% S and 26.6% Na.

9.02 tons of molten liquid soda matte were removed from the smelting furnace after completion of the smelting and, after solidification of the soda matte and crushing to about ¼ inch particle size, was introduced into the leach tank. The soda matte contained, by weight, 10.9% Sb, 1.42% As, 19.3% Cu, 27.6% Cu, 1.77% Ag, 15.4% Na and 3.7% CaO. Particulate solids were recovered from the smelting furnace in the baghouse, and 0.706 ton of the recovered particulate solids, which contained, by weight, 17.4% Sb, 14.7% As, 7.7% Cu, 14.8% S, 0.93% Ag and 17.0% Na were also introduced into the leach tank. 0.212 ton of hydrated lime having a CaO content of 71.5% and 14.5 cubic meters of water were also introduced into the leach tank. The leaching was carried out for a period of 120 minutes at a temperature of 85°C. and with vigorous agitation to keep the soda matte particles in suspension. The liquid slurry or suspension from the leach tank was then filtered and 8.56 tons of wet filter cake was obtained, and 17.5 cubic meters of leach solution filtrate was also obtained. The filter cake was washed on the filter with 5.57 cubic meters of water. The filter cake was allowed to air dry and partially oxidize, and 7.94 metric tons of the air dry, oxidized filter cake was obtained. Such filter cake contained, by weight, 0.70% Sb, 2.24% As, 22.5% Cu, 20.5% S, 2.09% Ag, 7.64% Na and 6.11% CaO, and the leach solution filtrate contained Sb, 60 g/l; As, 3.1 g/l; S, 48.7 g/l and Na, 51.5 g/l.

NaOH in the amount of 0.546 ton and 0.16 ton of caustic slag from the antimony cathode melting furnace were added to such leach solution and the thus-produced liquid was supplied as electrolyte feed to electrolytic cells of the electrowinning operation. The caustic slag contained, by weight, 35.5% Na, 30.0% Sb and 1.2% As. 1.02 tons of cathodes containing, by weight, 97.5% Sb, 0.19% As and 0.013% Ag were produced in the electrowinning cells. The cathodes were melted in a melting furnace and 0.10 ton of Na OH was added to the melt in the furnace. 0.943 ton of high purity antimony metal containing, by weight, 99.9% Sb, < 0.003% As and 0.014% Ag was obtained from the melting furnace. The caustic slag was skimmed off the molten metal in the melting furnace and passed for addition to the leach solution filtrate as aforementioned.

The spent electrolyte from the electrowinning cells was supplied in amount of 17.5 cubic meters to the evaporator. The spent electrolyte from the electrowinning cells contained Sb, 6.2 g/l; As, 3.1 g/l; total S 48.7 g/l; Ag, 0.001 g/l and Na, 72.3 g/l prior to being introduced into the evaporator. 14.2 tons of vapor were evolved from the spent electrolyte in the evaporator, and 4.80 tons of concentrated salts, referred to as return salts, were withdrawn from the evaporator and returned as feed to the matte smelting furnace. The return salts contained, by weight, 2.25% Sb, 1.12% As, 17.7% S, and 26.6% Na.

EXAMPLE II

Example I is repeated utilizing the same materials in the same amounts and under the same process conditions, except that in this Example II, no hydrated lime is charged into the matte smelting furnace and no hydrated lime is added to the leach tank. the metallic antimony obtained undesirably contained arsenic in amount materially in excess of 0.10% by weight.

What is claimed is:

1. A process for recovery of antimony values from a material containing a sulfo-antimony compound of copper and arsenic which comprises:
   a. smelting a charge comprising the material containing the sulfo-antimony compound of copper and arsenic, sodium sulfide, calcium values supplied as lime and/or limestone, and a reducing agent for a period sufficient to convert at least a major portion of the antimony to a water-soluble sodium compound of antimony and sulfur and convert at least a major portion of the arsenic to at least one water-insoluble calcium compound of arsenic and oxygen;
   b. the sodium sulfide being incorporated in the charge for the smelting in an amount sufficient to convert at least a major portion of the antimony to the water-soluble sodium compound of antimony and sulfur, and the calcium values being incorporated into the smelting charge in an amount sufficient to convert at least a major portion of the arsenic to the water-insoluble calcium compound of arsenic and oxygen;
   c. leaching an alkaline matte obtained from the smelting of (a) containing the water-soluble sodium compound of antimony and sulfur and the water-insoluble calcium compound of arsenic and oxygen with an aqueous liquid to dissolve the soluble sodium compound of antimony and sulfur to the substantial exclusion of the calcium compound of arsenic and oxygen and a water-insoluble sulfur compound of copper; and d. separating an aqueous leach solution containing the soluble sodium compound of antimony and sulfur from an insoluble leach residue containing the insoluble calcium compound of arsenic and the insoluble sulfur compound of copper.

2. The process of claim 1 wherein the sodium sulfide is incorporated in the smelting charge in an amount sufficient to provide in the leach solution an atomic ratio of $S^=$ to Sb within the atomic ratio range of about 2.5:1 to about 3.2:1 respectively, and the calcium values are supplied to the smelting charge in an amount sufficient to provide in the alkaline matte an atomic ratio of Ca to As within the atomic ratio range of about 2.5:1 to about 5:1 respectively.

3. The process of claim 2 wherein the calcium values are supplied as lime.

4. The process of claim 3 wherein the reducing agent is a solid carbonaceous reducing agent.

5. The process of claim 4 wherein the solid carbonaceous reducing agent is coke.

6. The process of claim 3 wherein the water-soluble sodium compound of antimony and sulfur is $Na_3SbS_3$ and the water-insoluble calcium compound of arsenic and oxygen is at least one of calcium ortho-arsenate, $Ca_3(AsO_4)_2$, and calcium arsenite, $Ca_3(AsO_3)_2$.

7. The process of claim 3 wherein the smelting is effected at a temperature in the range of about 1600°F. to about 1900°F.

8. The process of claim 7 wherein the smelting temperature is in the range of about 1600°F. to about 1750°F.

9. The process of claim 3 wherein the lime is incorporated in the smelting charge prior to melting the charge.

10. The process of claim 3 wherein the leaching is carried out at a temperature in the range of about 65°C. to about 90°C.

11. The process of claim 10 wherein the leaching is carried out at a temperature in the range of about 80°C. to about 90°C.

12. The process of claim 3 wherein calcium values are also added to the leach solution.

13. The process of claim 12 wherein the calcium values are added as lime.

14. The process of claim 3 wherein the material containing the sulfo-antimony compound of copper and arsenic also contains silver, and the silver reports in the leach residue as an insoluble sulfur compound of silver.

15. The process of claim 2 wherein the reducing agent is a solid carbonaceous reducing agent.

16. The process of claim 15 wherein the solid carbonaceous reducing agent is coke.

17. The process of claim 1 wherein solid salts comprising residual antimony, arsenic, sodium and sulfur and obtained from evaporation of an electrowinning spent electrolyte to remove water are also supplied to the smelting charge.

18. The process of claim 1 wherein the water-soluble sodium compound of antimony and sulfur is $Na_3SbS_3$ and the water-insoluble calcium compound of arsenic is at least one of calcium ortho-arsenate, $Ca_3(AsO_4)_2$, and calcium arsenite, $Ca_3(AsO_3)_2$.

19. The process of claim 1 wherein the leach solution containing the soluble sodium compound of antimony and sulfur is passed into the electrolytic cell of an electrowinning operation for electrolytic recovery of metallic antimony.

20. The process of claim 19 wherein a caustic slag comprising primarily sodium and antimony is admixed with the leach solution prior to its introduction into the electrowinning electrolytic cell.

21. The process of claim 19 wherein caustic soda is added to the leach solution prior to its introduction into the electrowinning electrolytic cell.

22. The process of claim 1 wherein calcium values are added to the leach solution.

23. The process of claim 22 wherein the calcium values are added as lime.

24. The process of claim 1 wherein the material containing the sulfo-antimony compound of copper and arsenic also contains silver, and the silver reports in the leach residue as an insoluble sulfur compound of silver.

25. The process of claim 1 wherein the sodium sulfide is incorporated in the smelting charge in an amount sufficient to provide in the leach solution an atomic ratio of $S^=$ to Sb within the atomic ratio range of about 2.0:1 to about 3.5:1 respectively, and the calcium values are supplied to the smelting charge in an amount sufficient to provide in the alkaline matte an atomic ratio of Ca to As within the atomic ratio range of about 1.3:1 to about 9.5:1 respectively.

26. The process of claim 1 wherein the material containing the sulfo-antimony compound of copper and arsenic is tetrahedrite ore concentrate.

27. The process of claim 11 wherein the material containing the sulfo-antimony compound of copper and arsenic is tetrahedrite ore concentrate.

* * * * *

UNITED STATES PATENT OFFICE
CERTIFICATE OF CORRECTION

Patent No. 3,969,202      Dated July 13, 1976

Inventor(s) Adrian E. Albrethsen, Max L. Hollander and William H. Wetherill

It is certified that error appears in the above-identified patent and that said Letters Patent are hereby corrected as shown below:

First page, column 1, the "Assignee" line, "Asarco Incorporated" should read -- ASARCO Incorporated --. Column 2, line 12, "filered" should read -- filtered --. Column 7, line 50, "aresnic" should read -- arsenic --.

Signed and Sealed this

Second Day of November 1976

[SEAL]

Attest:

RUTH C. MASON
Attesting Officer

C. MARSHALL DANN
Commissioner of Patents and Trademarks